UNITED STATES PATENT OFFICE.

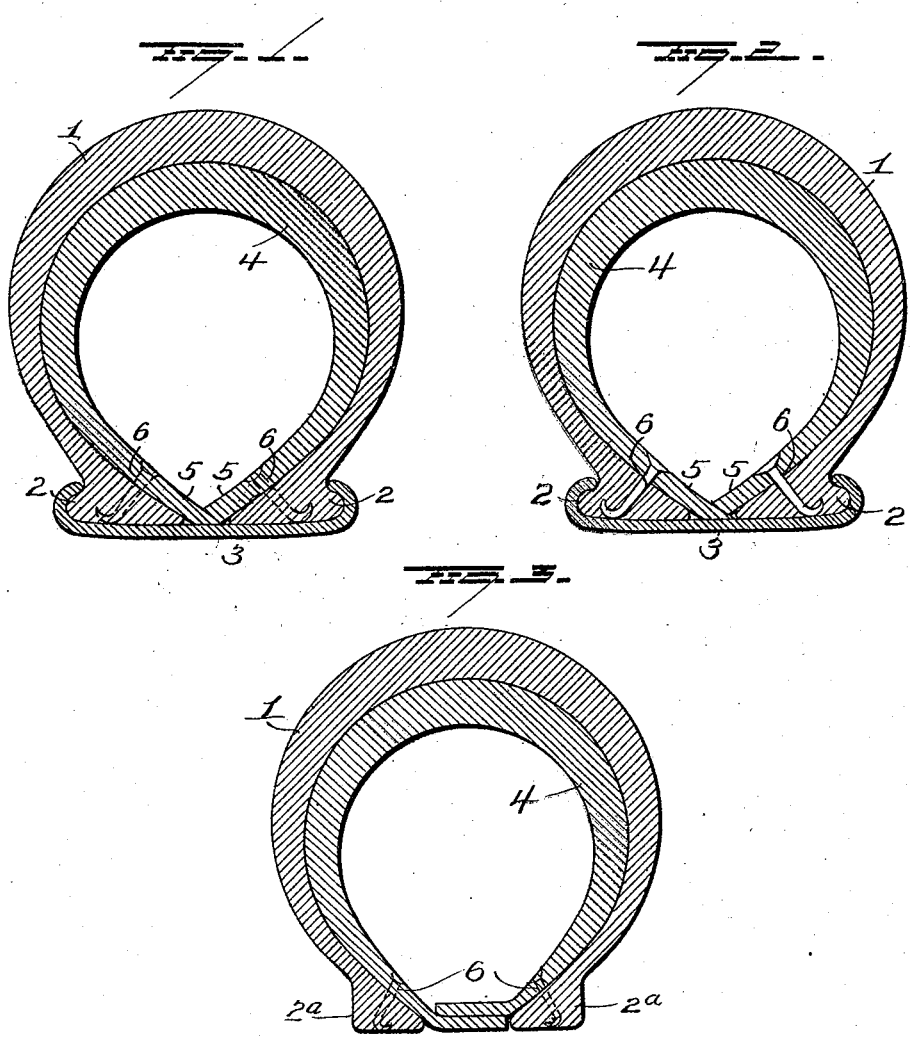

TIMOTHY TAYLOR OVERSHINER, OF MARION, INDIANA.

TIRE.

1,413,291.      Specification of Letters Patent.    Patented Apr. 18, 1922.

Application filed July 23, 1920. Serial No. 398,394.

*To all whom it may concern:*

Be it known that I, TIMOTHY T. OVERSHINER, a citizen of the United States, and a resident of Marion, in the county of Grant and State of Indiana, have invented certain new and useful Improvements in Tires; and I do hereby declare the following to be a full, clear, and exact description of the invention, such as will enable others skilled in the art to which it appertains to make and use the same.

This invention relates to improvements in tires and more particularly to tire casings,—the object of the invention being to provide simple and efficient means whereby a tire casing of ordinary construction may be reinforced or a damaged casing repaired with the use of an inner casing member which may be formed from an old tire casing, and to so unite the inner or repair casing member to the outer or original casing member that all portions of the two casing members, except the edge portions thereof shall be free whereby the inner casing member may be caused to conform with the inner contour of the outer casing member and be pressed accurately against the latter by the inflated inner tube.

A further object is to so connect the edge portions of the two casing members that they may be permanently united, and so that such connection may be effected without special construction of the two casing members and so also that the services of a skilled mechanic will not be required to effect the permanent connection of the edge portions of the two tire sections.

With these and other objects in view, the invention consists in certain novel features of construction and combinations of parts as hereinafter set forth and pointed out in the claim.

In the accompanying drawings; Figure 1 is a view showing a portion of a tire casing and rim of the clincher type and illustrating an embodiment of my invention; Figure 2 is an enlarged sectional view showing the manner of securing the edge portions of the two casing members, and Figure 3 is a view showing the application of my invention to a tire casing provided with flat-faced beads.

1 represents a tire casing, which may be of any standard or preferred construction provided at its edges with beads 2 which may be such as employed with the well-known clincher construction to be engaged by flanges of a rim 3, or said beads may be of the type in which the beads are made with flat faces as shown at $2^a$ Figure 3.

An inner casing member 4 is located within the main tire casing member 1, and may be of the same construction as said main casing member, except that said inner member is not provided with beads but its edge portions 5, 5, are made to so overlap each other as to close the space between the beaded edge portions of the main casing member 1.

For the inner casing member, an old tire casing with the beads removed may be utilized. The inner and main or outer casing members are permanently secured together only near their edge portions, and for the purpose of so permanently connecting the two casing members, I employ metal fastening means (preferably of non-corrodible metal), such as nails, rivets, staples or screws, which are passed through the beads of the main or outer casing member and through the inner casing member near the edge portions thereof. When nails or staples are employed, their forward ends may be bent over, clinched or upset.

By means of the construction above described, a tire casing of ordinary construction may be reinforced both at the tread portion and also near the edge portions, and thus the danger of puncture and the cutting of the tire by the rim will be reduced to a minimum. My improvements also permit the ready repair of a worn or punctured tire casing. By permanently securing the inner or reinforcing casing member near its edges only to the main or outer casing member, the major portion of said inner casing member will be caused to conform closely to the interior contour of the main or outer casing member, by the inflation of the pneumatic tube, and any creeping of the inner or reinforcing casing member will be obviated.

My improvements are simple, do not require the services of a skilled mechanic to install them, and provide for the quick and easy repair of a damaged casing or the reinforcement of a worn casing. Tire casings of ordinary construction may be utilized, thus avoiding necessity for specially made parts to accomplish the purpose of my invention.

Having fully described my invention what

I claim as new and desire to secure by Letters-Patent, is:—

A tire casing construction comprising an outer casing member provided with beads near its edges, an inner casing member and nails passing through the inner casing member and the heads of the outer casing member and clinched.

In testimony whereof, I have signed this specification in the presence of two subscribing witnesses.

TIMOTHY TAYLOR OVERSHINER.

Witnesses:
D. M. McLaughlin,
R. W. Ramsier.